(12) United States Patent
Winzer

(10) Patent No.: US 9,008,507 B2
(45) Date of Patent: Apr. 14, 2015

(54) SECURE DATA TRANSMISSION USING SPATIAL MULTIPLEXING

(75) Inventor: Peter J. Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 991 days.

(21) Appl. No.: 13/077,056

(22) Filed: Mar. 31, 2011

(65) Prior Publication Data

US 2012/0177365 A1 Jul. 12, 2012

Related U.S. Application Data

(60) Provisional application No. 61/431,040, filed on Jan. 9, 2011.

(51) Int. Cl.
| | | |
|---|---|---|
| *H04J 14/00* | (2006.01) | |
| *H04B 10/2581* | (2013.01) | |
| *H04B 10/50* | (2013.01) | |
| *H04B 10/85* | (2013.01) | |
| *H04J 14/02* | (2006.01) | |
| *H04J 14/04* | (2006.01) | |

(52) U.S. Cl.
CPC ........ *H04B 10/2581* (2013.01); *H04B 10/5053* (2013.01); *H04B 10/5055* (2013.01); *H04B 10/85* (2013.01); *H04J 14/00* (2013.01); *H04J 14/02* (2013.01); *H04J 14/04* (2013.01)

(58) Field of Classification Search
CPC .................................................. H04B 10/2581
USPC ....................................................... 398/26, 44
See application file for complete search history.

(56) References Cited

U.S. PATENT DOCUMENTS

| 3,761,716 A | 9/1973 | Kapron et al. | |
|---|---|---|---|
| 7,149,256 B2 * | 12/2006 | Vrazel et al. | 375/295 |

(Continued)

FOREIGN PATENT DOCUMENTS

| EP | 1772983 A1 | 4/2007 |
|---|---|---|
| JP | 1079704 A1 | 3/1998 |

(Continued)

OTHER PUBLICATIONS

Stefan Schollmann et al: "10.7 Gb/s Over 300 m GI-MMF Using a 2 * 2 MIMO System Based on Mode Group Diversity Multiplexing" Optical Fiber Communication Conference and Exposition National Fiber Optic Engineers Conference, OFCNFOEC 2007, Mar. 25-29, 2007, Anaheim, CA, USA, IEEE, Piscataway, NJ, USA. Mar. 1, 2007.

(Continued)

*Primary Examiner* — Danny Leung
(74) *Attorney, Agent, or Firm* — A. R. Ralston; D. M. LaBruno

(57) ABSTRACT

An example apparatus includes a mode selective detector, a measurement module, a difference calculator and a threshold and alarm module. The mode selective detector detects a plurality of modes of a spatially multiplexed signal. The measurement module measures a parameter for the plurality of modes of the spatially multiplexed signal, wherein the parameter is a power or a signal to noise ratio (SNR). The difference calculator compares the measured parameter among a subset modes and/or among a known set of unperturbed parameters and determines a differential, the subset including at least one mode. The threshold and alarm module sets an alarm indicator when the differential is out of bounds.

22 Claims, 2 Drawing Sheets

(56) References Cited

U.S. PATENT DOCUMENTS

| | | | |
|---|---|---|---|
| 2003/0072050 A1* | 4/2003 | Vrazel et al. | 359/110 |
| 2004/0247238 A1 | 12/2004 | Argon et al. | |
| 2007/0092265 A1* | 4/2007 | Vrazel et al. | 398/189 |
| 2007/0116400 A1 | 5/2007 | Murphy et al. | |
| 2010/0329670 A1 | 12/2010 | Essiambre | |
| 2010/0329671 A1 | 12/2010 | Essiambre et al. | |
| 2010/0329693 A1* | 12/2010 | Chen | 398/147 |

FOREIGN PATENT DOCUMENTS

| | | | |
|---|---|---|---|
| JP | 10242942 | A1 | 9/1998 |
| JP | 11331132 | A1 | 11/1999 |
| JP | 2005229598 | A1 | 8/2005 |
| WO | PCT/US2012/020154 | | 4/2012 |
| WO | PCT/US2012/020147 | | 5/2012 |
| WO | PCT/US2012/020154 | | 6/2012 |

OTHER PUBLICATIONS

Kumar Appaiah et al: "Advanced Modulation and Multiple-Input Multiple-Output for Multimode Fiber Links", IEEE Photonics Technology Letters, vol. 23, No. 20—Oct. 1, 2011—pp. 1424-1426.

Argon et al: "Spatially Resolved Equalization and Forward Error Correction for Multimode Fiber Links" Proceedings of IEEE International Conference on Communications—vol. 3, Apr. 28, 2002—pp. 1726-1730.

* cited by examiner

SECURE DATA TRANSMISSION USING SPATIAL MULTIPLEXING

PRIORITY CLAIM

The application claims benefit of U.S. Provisional Application No. 61/431,040 filed, Jan. 9, 2011.

CROSS REFERENCE TO RELATED APPLICATIONS

The subject matter of this application is related to that of U.S. patent application Ser. No. 13/076,987, which application is incorporated herein by reference in its entirety.

FIELD OF THE INVENTION

The invention relates to optical transmission equipment and, more specifically but not exclusively to the equipment that enables data transmission using spatial multiplexing.

BACKGROUND INFORMATION

This section introduces aspects that may help facilitate a better understanding of the disclosed invention(s). Accordingly, the statements of this section are to be read in this light and are not to be understood as admissions about what is in the prior art or what is not in the prior art.

Today's fiber-optic optical transmission systems are either based on single-polarization or polarization-division multiplexed single-transverse-mode transmission, or on multimode transmission where all modes essentially carry the same data. Both such systems are vulnerable to tapping, which is done by bending the transmission fiber such that a small amount of light is coupled out at a local bend. The tapped light is then detected by a sensitive receiver at the location of the fiber bend, giving an eavesdropper access to the full wavelength-division multiplexed (WDM) spectrum transmitted over the fiber. The small amount of extra loss is not easily detectable at the rightful receiver located at the end of the transmission fiber, which permits the eavesdropper to go unnoticed.

A method of detecting the presence of an eavesdropper in a single-mode fiber system is furnished in U.S. Patent Application Publication No. 2008/001888, by D. Butler et al, published Jan. 24, 2008, and entitled "Intrusion Detection in Optical Fiber Networks," which application is incorporated herein by reference in its entirety, and wherein transmission is done at several optical wavelengths, and a change in the differential loss between these wavelength is used as an indicator for the presence of an eavesdropper.

SUMMARY

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter not to delineate the scope of the disclosed subject matter. Its sole purpose is to present some concepts in a simplified form as a prelude to the more detailed description that is discussed later.

The systems described above in the Background of the Specification have at least two important detriments. First, single-mode and conventional multi-mode fibers are inherently vulnerable to bend-induced tapping. Second, a system using in-line optical amplifiers will generally equalize the power levels of the amplified signals at all wavelengths and will hence convert a wavelength-dependent loss differential into a signal-to-noise ratio (SNR) differential, which in turn prohibits the detection of an eavesdropper by a simple differential loss measurement at the receiver.

Furthermore, while quantum-based techniques to obtain physical-layer security may be fundamentally robust to eavesdropping, they are not compatible with an optically amplified transmission infrastructure, which severely limits their reach as well as their applicability in realistic commercial networks.

Embodiments provided herein address one or more of the detriments associated with transmitting data using physical-layer security based on classical optical communications without the need to resort to quantum-cryptographic techniques such as quantum key distribution. One or more embodiments herein disclosed allow for secure physical-layer transmission over spatially multiplexed (e.g., multi-core or multi-mode) optical fiber. One or more disclosed embodiments allow for reception of secure physical-layer transmissions over spatially multiplexed (e.g., multi-core or multi-mode) optical fiber. Still other disclosed embodiments provide the ability to identify the presence of an eavesdropper tapping into such fiber utilized for such spatially multiplexed physical-layer transmission through the use of spatially-resolved differential loss or Signal-To-Noise-Ratio (SNR) measurements.

In one embodiment, a transmitter includes and encoder, a plurality of modulator and a spatial multiplexer. The encoder is configured to encode one or more input bit streams into a plurality of coded bit streams and provide the plurality of coded bit streams as output. Each of the plurality of modulators is configured to receive a respective one of the plurality of coded bit streams, modulate the respective one of the plurality of coded bit streams, and provide a modulated output signal. The spatial multiplexer configured to spatially multiplex the plurality of modulated output signals for insertion on a spatially multiplexing waveguide The spatial multiplexer may be configured to provide at least one of the spatially multiplexed plurality of modulated output signals to a mode of a multi-mode fiber or a core of a multi-core fiber. The modulator may perform modulation using a polarization-multiplexed complex-valued optical modulation format, an intensity-modulated optical modulation format, on/off keying, polarization-multiplexed quadrature phase shift keying, or polarization-multiplexed quadrature amplitude modulation. Other modulation formats may be utilized.

In one embodiment, recovery of the one or more input bit streams requires that all of the plurality of spatially multiplexed modulated output signals corresponding to the one or more input bit streams to be detected must be simultaneously and spatially selectively detected. In another embodiment, a subset of the plurality of spatially multiplexed modulated output signals which correspond to the one or more input bit streams must be simultaneously and spatially selectively detected in order to recover a first input bit stream.

In one embodiment, the encoder encodes information of the one or more input bit streams in parity of bits of the plurality of coded bit streams, and the plurality of modulators are configured to modulate the plurality of coded bit streams for all modes or cores at a same transmit wavelength and within a same symbol time slot. In another embodiment, the plurality of modulators is configured to modulate the plurality of coded bit streams for each mode or core at a different transmit wavelength. In yet another embodiment, the plurality of modulators are configured to modulate the plurality of coded bit streams for modes or cores within a plurality of different symbol time slots The encoder may encode information of the one or more input bit streams in a logic combination or algebraic combination of information contained in bits of the plurality of coded bit streams. The logical combination may includes an "and", "or", or "xor" operation between coded bit stream bits; the algebraic combination may include an algebraic sum, difference, or product between the coded bit stream bits.

In one embodiment, the transmitter includes a mode selective detector configured to convert a plurality of modes received from the spatially multiplexing waveguide into a plurality of coded bit streams, wherein the number of coded bit streams is less than or equal to the number of modes; and a decoder configured to perform a reverse operation the encoder, the decoder being configured to produce one or more output bit streams from the plurality coded bit streams.

In one embodiment, a method for secure transmission includes encoding by an encoder one or more input bit streams across a plurality of coded bit streams, modulating by a modulator respective ones of the plurality of coded bit streams to form a plurality of modulated signals, and spatially multiplexing by a spatial multiplexer the plurality of modulated output signals for insertion on a spatially multiplexing waveguide. The method may also include inserting the plurality of spatially multiplexed modulated signals into a spatially multiplexing waveguide.

In other embodiment, the spatially multiplexing waveguide may be a multi-mode fiber or a multi-core fiber. The modulating of another embodiment may utilize a polarization-multiplexed complex-valued optical modulation format, an intensity-modulated optical modulation format, on/off keying, polarization-multiplexed quadrature phase shift keying or polarization-multiplexed quadrature amplitude modulation or the like.

Recovery of the one or more input bit streams may require simultaneous and spatially selective detection of all of the plurality of spatially multiplexed modulated output signals corresponding to the one or more input bit streams to be detected in one embodiment. In another embodiment, a subset of the plurality of spatially multiplexed modulated output signals that correspond to the one or more input bit streams must be simultaneously and spatially selectively detected in order to recover a first input bit stream.

In one embodiment, encoding encodes information of the one or more input bit streams in parity of bits of the plurality of coded bit streams. In various embodiments, modulating may modulate the plurality of coded bit streams for all modes or cores at a same transmit wavelength and within a same symbol time slot, may modulate the plurality of coded bit streams for each mode or core at a different transmit wavelength, or may modulate the plurality of coded bit streams for modes or cores within a plurality of different symbol time slots. Modulation may include modulating information of the one or more input bit streams in a logic combination or algebraic combination of information contained in bits of the plurality of coded bit streams.

In an example embodiment, a receiver includes a mode selective detector configured to convert a plurality of modes received from a spatially multiplexing fiber into a plurality of coded bit streams, wherein the number of coded bit streams is less than or equal to the number of modes, and a decoder configured to decode information for one or more output bit streams from parity of the plurality of coded bit streams bits, wherein the plurality of coded bit streams for all the modes are provided at a same transmit wavelength and within a same symbol time slot.

The plurality of modes may be received in a polarization-multiplexed complex-valued optical modulation format, an intensity-modulated optical modulation format, on/off keying format, a polarization-multiplexed quadrature phase shift keying format, or a polarization-multiplexed quadrature amplitude modulation format and like.

In one embodiment, recovery of the one or more output bit streams requires that all of the plurality of modes corresponding to the one or more output bit streams be detected simultaneously and spatially selectively. In another embodiment, a subset of the plurality of modes which correspond to the one or more bit streams must be simultaneously and spatially selectively detected in order to recover a first input bit stream.

The decoder may be configured to decode information for the one or more output bit streams from parity of bits of the plurality of coded bit streams. The decoder may decode information for the one or more output bit streams based on a logical combination including at least one of an "and", "or", or "xor" operation performed between coded bit stream bits. In another embodiment, the decoder is configured to decode information for the one or more output bit streams based on an algebraic combination including at least one of an algebraic sum, difference, or product between coded bit stream bits.

In one embodiment, the receiver includes a measurement module for measuring a parameter for the plurality of modes received from the spatially multiplexing fiber, wherein the parameter is a power or a signal to noise ratio (SNR), a difference calculator for comparing the measured parameter among a subset modes and/or among a known set of unperturbed parameters and determining a differential, the subset including at least one mode, and a threshold and alarm module for setting an alarm indicator when the differential is out of bounds. The threshold and alarm module may be configured to set the alarm indicator when the differential changes by an amount greater than a threshold.

An example method includes receiving at a receiver a spatially multiplexed signal, measuring a parameter for each mode of the spatially multiplexed signal, wherein the parameter is a power or a signal to noise ratio (SNR), comparing the measured parameter among a subset of modes and/or among a known set of unperturbed parameters and determining a differential, the subset including at least one mode, and setting an alarm indicator when the differential is out of bounds. It may be determined that the differential is out of bounds when the differential changes by an amount greater than a threshold. The method may be performed optically or electronically.

In one embodiment, the method also includes converting a plurality of modes received in the spatially multiplexing signal into a plurality of coded bit streams, wherein the number of coded bit streams is less than or equal to the number of modes, and decoding information for one or more output bit streams from parity of the plurality of coded bit streams bits, wherein the plurality of coded bit streams for all the modes are provided at a same transmit wavelength and within a same symbol time slot. In one embodiment, a subset of the plurality of modes which correspond to the one or more bit streams must be simultaneously and spatially selectively detected in order to recover a first transmitted bit stream.

One example apparatus comprises a mode selective detector for detecting a plurality of modes of a spatially multiplexed signal, a measurement module for measuring a parameter for the plurality of modes of the spatially multiplexed signal, wherein the parameter is a power or a signal to noise ratio (SNR), a difference calculator for comparing the measured parameter among a subset modes and/or among a known set of unperturbed parameters and determining a differential, the subset including at least one mode, and a threshold and alarm module for setting an alarm indicator when the differential is out of bounds. At least one of the mode selective detector, the measurement module, the difference calculator and the threshold and alarm module may be optical elements. At least one of the mode selective detector, the measurement module, the difference calculator and the threshold and alarm module are electronic elements.

In one embodiment, the apparatus also includes at least one of the mode selective detector which is configured to decode information for one or more output bit streams from parity of the plurality of coded bit streams bits, wherein the plurality of coded bit streams for all the modes are provided at a same transmit wavelength and within a same symbol time slot.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the example embodiments and wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
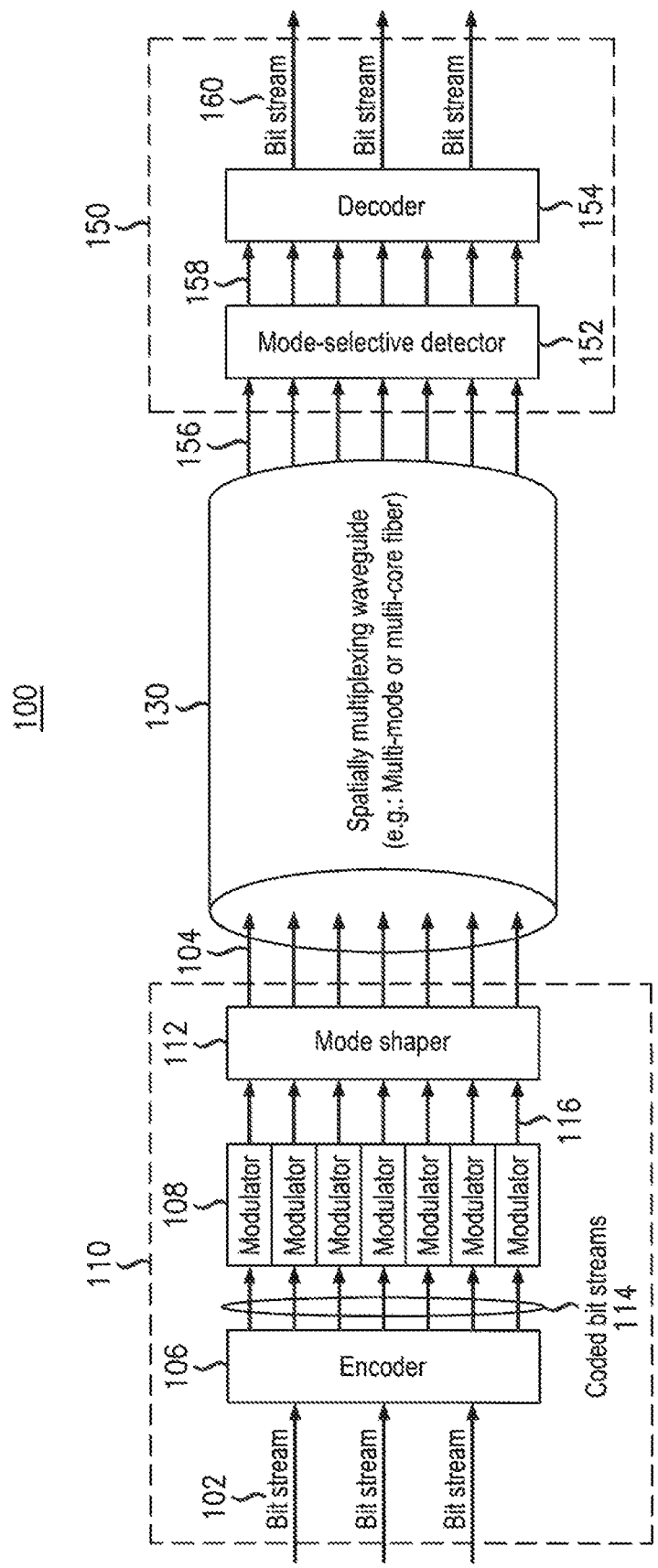
FIG. 1 illustrates an example system for secure data transmission including example transmitter, optical link and receiver.

Spatial multiplexing in multi-core or multi-mode optical waveguides is utilized for physical-layer data security according to the disclosed embodiments of the inventions. FIG. 1 illustrates an example system 100 for secure data transmission including example transmitter 110, optical link 130 and receiver 150. As shown in FIG. 1, one or more secure bit streams 102 are encoded by a transmitter 110 into $M_{TX} \leq M$ modes or cores 104 supported by a spatially multiplexing waveguide 130 in such a way that one needs to simultaneously and/or spatially selectively detect all (or a subset of) the modes/cores in order to access the transmitted information at the receiver 150. As mentioned, the spatially multiplexing waveguide 130 may be a multi-mode or multi-core fiber.

While the step of encoding by an encoder 106 at the transmitter 110 is described in more detail below, the step of modulation by a modulator 108 at the transmitter 110 uses intensity-modulated optical modulation formats (such as on/off keying), or more generally polarization-multiplexed complex-valued optical modulation formats (such as polarization-multiplexed quadrature phase shift keying or quadrature amplitude modulation and the like).

Regarding the step of mode shaping by a mode shaper 111 at the transmitter 110, methods for transmitting and receiving information in a mode-selective way are disclosed in U.S. Patent Application Publication No. 2010/0329670, by R. Essiambre et al, published Dec. 30, 2010, and entitled "Receiver for Optical Transverse-Mode-Multiplexed Signals," and U.S. Patent Application Publication No. 2010/0329671, by R. Essiambre et al, published Dec. 30, 2010, and entitled "Transverse-Mode-Multiplexing For Optical Communication Systems," and both applications are incorporated herein by reference in their entirety. In particular, the possibility of performing polarization-multiplexed WDM transmission on each mode is contemplated in one embodiment of the present invention even though this is not shown in the figure for the reason of the clarity of the illustration.

In FIG. 1, the illustrated transmitter 110 includes an encoder 106, a plurality of modulators 108 and a mode shaper 112. The encoder 106 encodes one or more input bit streams 102 into a plurality of coded bit streams 114 and provides the plurality of coded bit streams as output of the encoder. Each of the plurality of modulators 108 receives a respective one of the plurality of coded bit streams 114, modulates the respective one of the plurality of coded bit streams, and provides a modulated output signal 116. The mode shaper 112 spatially multiplexes the plurality of modulated output signals 116 for insertion on a spatially multiplexing waveguide 130.

"$M_{TX}$", "M", and "$M_{RX}$", i.e., the number of modes the transmitter launches 104, the number of modes supported by the waveguide (not explicitly shown), and the number of modes extracted 156 by the receiver 150 may be different. Obviously, $M_{TX}$, $M_{RX}$ may be M. The difference between these number of mode launched and extracted is indicated by the varying numbers of arrows at the input and output of the fiber illustrated in FIG. 1.

Regarding the step of encoding, many spatially spreading codes could be envisioned in this context. One possible code encodes an input bit stream in the parity of the bits transmitted on all or a subset of modes/cores at the same transmit wavelength and within the same symbol time slot. Unless all modes/cores across which the input bit stream is being spread are correctly and simultaneously detected, the parity of the resulting information bits cannot be determined and hence the input bit stream remains secure. Another code encodes the input bit stream in the parity of the bits transmitted on all or a subset of modes/cores at different transmit wavelengths and/or within different symbol time slots, taking advantage of time-varying and wavelength-dependent mode coupling that occurs during propagation. For example, mode 1 may always be launched at lambda1, mode 2 at lambda2, mode 3 on lambda3, etc. For example, mode 2 may be launched, say, 3 time slots away from mode 1, with mode 3 being launched 40 time slots away from mode 1, etc.

Instead of using "parity" to encode information of the input bit stream yet another code encodes the information in a logic or algebraic combination of the information contained in each employed mode, such as combinations of logical "and", "or", or "xor" combinations between modal bit streams, or algebraic sums, differences, products, etc. Alternatively, each input bit stream may be directly launched into one of the M modes (or a subset of modes) while one or more of the other modes are being used to transmit other signals (e.g., random or information bearing signals; e.g., redundancy for error-correction schemes) that would act as interferes upon a fiber tapping attack. The applicability of different secure coding schemes that may be utilized in combination with spatially multiplexed transmission will be apparent to a person skilled in the art. Note, as stated above, in one embodiment the encoder 106 acts as a pass though device for a bit stream 102 (i.e., the encoder essentially does nothing to modify the format of an input bit stream; that is, does not modify the content of an input bit stream but merely provides the input bit stream in the same form as a one or more coded bit streams (at least in name as described herein) that are output from the encoder) and where the security provided by such embodiments of a transmitter and communication system rely on the fact that multiple bit streams are present in the fiber during transmission.

In a spatially multiplexed multi-core or multi-mode optical fiber, waveguide bending will lead to light leakage out of the fiber, in analogy to single-mode or conventional multi-mode fiber. However, the spatial degree of information will be severely degraded or even completely lost during the fiber tapping process. Hence, since a fiber-tapping eavesdropper will no longer be able to correctly decode the information transmitted on individual modes, the secure information will be inevitably rendered useless to the fiber tapping eavesdropper.

In FIG. 1, the illustrated example receiver 150 includes a mode selective detector 152 and a decoder 154. In one embodiment, the mode selective detector 152 is configured to convert $M_{RX}$ modes received 156 from the spatially multiplexing fiber 130 into a plurality of K coded bit streams 158 (wherein K is less than or equal to M, M being a number of modes supported by a waveguide) and the decoder 154 configured to provide the reverse operation of any of the encoder at the corresponding transmitter and to produce one or mode output bit streams 160 from the K coded bit streams. In another embodiment, the mode selective detector 152 is configured to convert a plurality of modes received from the spatially multiplexing fiber (i.e., a plurality of received modes 156) into a plurality of coded bit streams 158, wherein the number of coded bit streams is less than or equal to the number of modes, and the decoder 154 is configured to decode information for one or more output bit streams 160 from parity of the plurality of coded bit streams bits, the plurality of coded bit streams corresponding to a signal to be recovered and being provided at a same transmit wavelength and within a same symbol time slot for all modes/cores.

Figure 2:
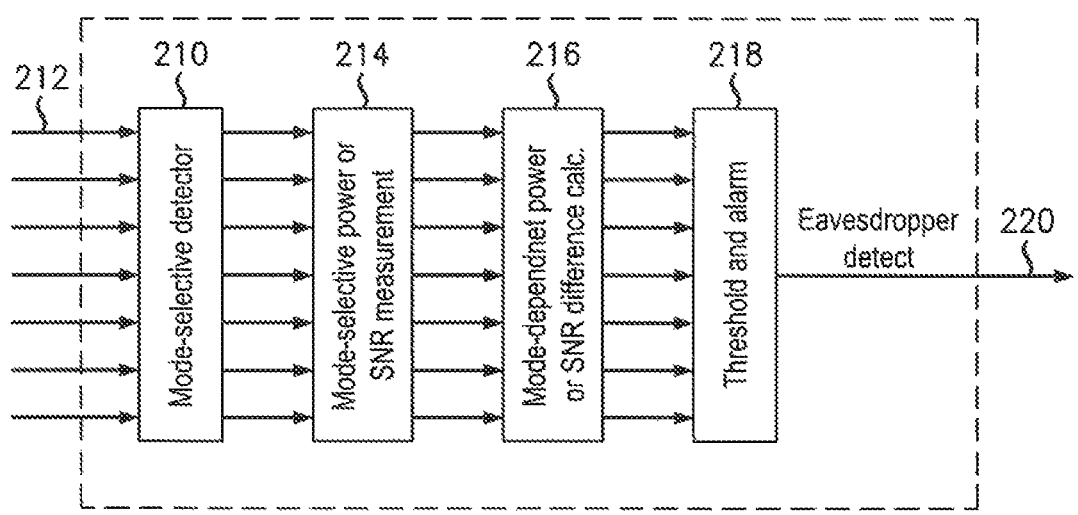
FIG. 2 illustrates a RX-side detection mechanism to determine the presence of a fiber tapping eavesdropper.

FIG. 2 illustrates a RX-side detection mechanism to determine the presence of a fiber tapping eavesdropper. As an additional aspect, and as shown in FIG. 2, the presence of an eavesdropper is detectable at a legitimate communication receiver 200 by measuring the loss differential compared to un-perturbed operation (or, in a system using optical amplification, the SNR differential compared to un-perturbed operation) between received modes. Both quantities can be made available to the receiver, e.g., through mode-deconvolving multiple-input multiple-output (MIMO) digital signal processing algorithms that are an integral part of some spatially multiplexing receivers, or through optical power or SNR measurements after optical mode separation (e.g., in the case of multi-core fiber with essentially uncoupled cores, for which the MIMO signal processing would not necessarily be implemented at the receiver). Accordingly, an eavesdropper detecting apparatus according to the principles disclosed here may be implemented as a stand-alone device 200 or as part of a receiver 200.

Whenever the measured power or SNR differentials deviate by an adjustable uncertainty margin from their normal (untapped) values, the receiver concludes the presence of a fiber bend and triggers an alarm to alert the operator of the potential presence of an eavesdropper. Depending on the system configuration, differential power or SNR measurements can also be based on any hybrid combination of K spatial modes and L wavelengths.

FIG. 2 illustrates an example apparatus for determining the presence of a fiber tapping eavesdropper. As illustrated, the apparatus 200 includes a mode selective detector 210 for detecting a plurality of modes 212 of a spatially multiplexed signal, a measurement device 214 for measuring a parameter for the plurality of modes of the spatially multiplexed signal, wherein the parameter is a power or a signal to noise ratio (SNR), a difference calculator 216 for comparing the measured parameter among a subset modes and/or among a known set of unperturbed parameters and determining a differential, the subset including at least one mode, and a threshold and alarm device for setting an alarm indicator 220 when the differential is out of bounds. At least one of the mode selective detector, the measurement module, the difference calculator and the threshold and alarm module may be optical elements. At least one of the mode selective detector, the measurement module, the difference calculator and the threshold and alarm module are electronic elements.

For example, a MIMO DSP as disclosed in the Essiambre et al patents application cited above may be utilized in one embodiment. A by-product of the MIMO DSP algorithms can be differential loss and differential SNR. Thus, the steps of the proposed methodology may be accomplished all-electronically. In case of essentially uncoupled multi-core, one would not use MIMO DSP. Thus, in one embodiment, the receiver 160 of FIG. 1 can optically tap off a fraction of the light received from each core (tapping not shown). The tapped-off light can then be analyzed optically, e.g., by optical power measurement, wavelength-resolved optical SNR measurement, etc. (These monitoring techniques themselves are known to one skilled in the art.) Once power or SNR are measured, the remaining steps of the methodology may be accomplished electronically (parameter comparison, threshold, alarm). Of course, hybrid solutions are possible.

In one embodiment, a method includes receiving a spatially multiplexed signal; measuring a parameter for each mode of the spatially multiplexed signal, wherein the parameter is a power or a signal to noise ratio (SNR); comparing the measured parameter among a subset of modes and/or among a known set of unperturbed parameters and determining a set of differentials, the subset of modes including at least one mode; and setting an alarm indicator when the set of differential indicates an out of bounds condition.

There are three aspects for the above comparing of parameters and determining of differentials. In one embodiment, differentials may be compared among measured parameters only. In another embodiment, the differentials are determined based on comparison made between measured parameters and corresponding nominal (un-perturbed) value, for example, a nominal value stored in a look-up table. In yet another embodiment, the comparison utilizes of combination of both of the above comparison methodologies.

The set of differentials may be determined to be out of bounds when a sum of the differentials or an individual differential changes by an amount greater than a threshold. The threshold may be a user-defined security threshold such that a hyper-sensitive user can set the threshold very tight and accept occasional false alarms, whereas a lesser sensitive user may set the threshold looser and avoid false alarms.

While this invention has been described with reference to illustrative embodiments, this description is not intended to be construed in a limiting sense to only the illustrated embodiments.

Embodiments of present invention may be implemented as circuit-based processes, including possible implementation on a single integrated circuit.

Unless explicitly stated otherwise, each numerical value and range should be interpreted as being approximate as if the word "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the following method claims, if any, recite steps in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor/s to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", "controllers", "devices" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "module" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A receiver comprising:
a mode selective detector configured to convert a plurality of modes received from a spatially multiplexing fiber into a plurality of coded bit streams, wherein the number of coded bit streams is less than or equal to the number of modes; and
a decoder configured to decode information for one or more output bit streams from parity of the plurality of coded bit streams bits, wherein the plurality of coded bit streams for all the modes are provided at a same transmit wavelength and within a same symbol time slot,
wherein the decoder is configured to decode information for the one or more output bit streams based on a logical combination including at least one of an "and", "or", or "xor" operation performed between coded bit stream bits.

2. The receiver of claim 1 wherein the plurality of modes are received in a polarization-multiplexed complex-valued optical modulation format, an intensity-modulated optical modulation format, on/off keying format, a polarization-multiplexed quadrature phase shift keying format, or a polarization-multiplexed quadrature amplitude modulation format.

3. The receiver of claim 1 wherein recovery of the one or more output bit streams requires that all of the plurality of modes corresponding to the one or more output bit streams be detected simultaneously and spatially selectively.

4. The receiver of claim 1 wherein a subset of the plurality of modes which correspond to the one or more bit streams must be simultaneously and spatially selectively detected in order to recover a first input bit stream.

5. The receiver of claim 1 wherein the decoder is configured to decode information for the one or more output bit streams from parity of bits of the plurality of coded bit streams.

6. The receiver of claim 1 further comprising:
a measurement module for measuring a parameter for the plurality of modes received from the spatially multiplexing fiber, wherein the parameter is a power or a signal to noise ratio (SNR);
a difference calculator for comparing the measured parameter among a subset modes and/or among a known set of unperturbed parameters and determining a differential, the subset including at least one mode; and
a threshold and alarm module for setting an alarm indicator when the differential is out of bounds.

7. The receiver of claim 6 wherein the threshold and alarm module is configured to set the alarm indicator when the differential changes by an amount greater than a threshold.

8. A receiver comprising:
a mode selective detector configured to convert a plurality of modes received from a spatially multiplexing fiber into a plurality of coded bit streams, wherein the number of coded bit streams is less than or equal to the number of modes; and
a decoder configured to decode information for one or more output bit streams from parity of the plurality of coded bit streams bits, wherein the plurality of coded bit streams for all the modes are provided at a same transmit wavelength and within a same symbol time slot,
wherein the decoder is configured to decode information for the one or more output bit streams based on an algebraic combination including at least one of an algebraic sum, difference, or product between coded bit stream bits.

9. The receiver of claim 8 wherein the plurality of modes are received in a polarization-multiplexed complex-valued optical modulation format, an intensity-modulated optical modulation format, on/off keying format, a polarization-multiplexed quadrature phase shift keying format, or a polarization-multiplexed quadrature amplitude modulation format.

10. The receiver of claim 8 wherein recovery of the one or more output bit streams requires that all of the plurality of modes corresponding to the one or more output bit streams be detected simultaneously and spatially selectively.

11. The receiver of claim 8 wherein a subset of the plurality of modes which correspond to the one or more bit streams must be simultaneously and spatially selectively detected in order to recover a first input bit stream.

12. The receiver of claim 8 wherein the decoder is configured to decode information for the one or more output bit streams from parity of bits of the plurality of coded bit streams.

13. The receiver of claim 8 further comprising:
a measurement module for measuring a parameter for the plurality of modes received from the spatially multiplexing fiber, wherein the parameter is a power or a signal to noise ratio (SNR);
a difference calculator for comparing the measured parameter among a subset modes and/or among a known set of unperturbed parameters and determining a differential, the subset including at least one mode; and
a threshold and alarm module for setting an alarm indicator when the differential is out of bounds.

14. The receiver of claim 13 wherein the threshold and alarm module is configured to set the alarm indicator when the differential changes by an amount greater than a threshold.

15. A receiver comprising:
a mode selective detector configured to convert a plurality of modes received from a spatially multiplexing fiber into a plurality of coded bit streams, wherein the number of coded bit streams is less than or equal to the number of modes;
a decoder configured to decode information for one or more output bit streams from parity of the plurality of coded bit streams bits, wherein the plurality of coded bit streams for all the modes are provided at a same transmit wavelength and within a same symbol time slot;
a measurement module for measuring a parameter for the plurality of modes received from the spatially multiplexing fiber, wherein the parameter is a power or a signal to noise ratio (SNR);
a difference calculator for comparing the measured parameter among a subset modes and/or among a known set of unperturbed parameters and determining a differential, the subset including at least one mode; and
a threshold and alarm module for setting an alarm indicator when the differential is out of bounds.

16. The receiver of claim 15 wherein the plurality of modes are received in a polarization-multiplexed complex-valued optical modulation format, an intensity-modulated optical modulation format, on/off keying format, a polarization-multiplexed quadrature phase shift keying format, or a polarization-multiplexed quadrature amplitude modulation format.

17. The receiver of claim 15 wherein recovery of the one or more output bit streams requires that all of the plurality of modes corresponding to the one or more output bit streams be detected simultaneously and spatially selectively.

18. The receiver of claim 15 wherein a subset of the plurality of modes which correspond to the one or more bit streams must be simultaneously and spatially selectively detected in order to recover a first input bit stream.

19. The receiver of claim 15 wherein the decoder is configured to decode information for the one or more output bit streams from parity of bits of the plurality of coded bit streams.

20. The receiver of claim 15 wherein the decoder is configured to decode information for the one or more output bit streams based on a logical combination including at least one of an "and", "or", or "xor" operation performed between coded bit stream bits.

21. The receiver of claim 15 wherein the decoder is configured to decode information for the one or more output bit streams based on an algebraic combination including at least one of an algebraic sum, difference, or product between coded bit stream bits.

22. The receiver of claim 15 wherein the threshold and alarm module is configured to set the alarm indicator when the differential changes by an amount greater than a threshold.

* * * * *